(12) United States Patent
Manevitz et al.

(10) Patent No.: US 12,118,077 B2
(45) Date of Patent: Oct. 15, 2024

(54) FEATURE EXTRACTION AND TIME SERIES ANOMALY DETECTION OVER DYNAMIC GRAPHS

(71) Applicant: Intuit Inc., Mountain View, CA (US)

(72) Inventors: Miriam Hanna Manevitz, Tel Aviv (IL); Liat Ben Porat Roda, Tel Aviv (IL); Or Basson, Tel Aviv (IL); Aviv Ben Arie, Tel Aviv (IL); Hagai Fine, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 940 days.

(21) Appl. No.: 17/154,293

(22) Filed: Jan. 21, 2021

(65) Prior Publication Data
US 2022/0229903 A1 Jul. 21, 2022

(51) Int. Cl.
*H04L 9/40* (2022.01)
*G06F 16/901* (2019.01)
(Continued)

(52) U.S. Cl.
CPC ........ *G06F 21/552* (2013.01); *G06F 16/9027* (2019.01); *G06F 17/16* (2013.01);
(Continued)

(58) Field of Classification Search
CPC ............. G06F 21/552; G06F 2221/034; G06F 2221/2101; H04L 63/1425; G06N 20/00; G06N 3/02
See application file for complete search history.

(56) References Cited

U.S. PATENT DOCUMENTS 6,704,320 B1 * 3/2004 Narvaez .................. H04L 45/48
  709/239
8,270,614 B2 * 9/2012 Kim ...................... H04L 9/0836
  380/278
(Continued)

FOREIGN PATENT DOCUMENTS

GB        2588812 A  *  5/2021  ............. H04L 63/12

OTHER PUBLICATIONS

Widanagamaachchi et al., Interactive Exploration of Large-Scale Time-Varying Data using Dynamic Tracking Graphs, IEEE, Oct. 2012 (Year: 2012).*

*Primary Examiner* — David Garcia Cervetti
(74) *Attorney, Agent, or Firm* — DLA Piper LLP US

(57) ABSTRACT

A plurality of graph snapshots for a plurality of consecutive periodic time samples maps between connected components in consecutive graph snapshots and describes at least one feature of each connected component. A recursively-built tree tracks an evolution of one of the connected components through the plurality of graph snapshots, the tree including a root node representing the connected component at a final one of the consecutive periodic time samples and a plurality of leaf nodes branching from the root node. A plurality of paths is extracted from the tree by traversing the tree from the root node to respective ones of the plurality of leaf nodes. Each path contains data describing an evolution of a respective one of the connected components through time as indicated by evolution of the at least one feature of the respective one of the connected components. Each of the plurality of paths is converted into a respective numerical vector of a plurality of numerical vectors that may be used as inputs to a time series anomaly detection algorithm.

20 Claims, 15 Drawing Sheets

(51) Int. Cl.
*G06F 17/16* (2006.01)
*G06F 21/55* (2013.01)
(52) U.S. Cl.
CPC .... H04L 63/1425 (2013.01); *G06F 2221/034* (2013.01); *G06F 2221/2101* (2013.01)

(56) References Cited

U.S. PATENT DOCUMENTS

| | | | | |
|---|---|---|---|---|
| 8,462,161 | B1* | 6/2013 | Barber | G06T 11/206 345/440.2 |
| 8,762,298 | B1* | 6/2014 | Ranjan | G06F 21/552 706/12 |
| 8,909,677 | B1* | 12/2014 | Aguilera | G06F 16/2246 707/797 |
| 9,015,716 | B2* | 4/2015 | Fletcher | G06F 9/45533 718/1 |
| 9,202,052 | B1* | 12/2015 | Fang | G06F 21/552 |
| 9,244,899 | B1* | 1/2016 | Greenbaum | G06F 40/177 |
| 9,843,596 | B1* | 12/2017 | Averbuch | G06F 21/554 |
| 9,846,780 | B2* | 12/2017 | Tonn | H04L 63/1441 |
| 9,967,265 | B1* | 5/2018 | Peer | H04L 63/1416 |
| 10,007,615 | B1* | 6/2018 | Gazit | G06F 12/0888 |
| 10,019,190 | B2* | 7/2018 | Rao | G06F 16/9024 |
| 10,148,680 | B1* | 12/2018 | Segev | H04L 63/1425 |
| 10,243,818 | B2* | 3/2019 | Fletcher | H04L 43/045 |
| 10,341,219 | B1* | 7/2019 | Luke | H04L 45/02 |
| 10,460,774 | B2* | 10/2019 | Lee | G06F 13/1684 |
| 10,581,891 | B1* | 3/2020 | Kapoor | G06F 9/455 |
| 10,650,021 | B2* | 5/2020 | Elias | G06F 16/2315 |
| 10,685,293 | B1* | 6/2020 | Heimann | H04L 63/1425 |
| 10,692,004 | B1* | 6/2020 | Segev | G06Q 50/01 |
| 10,733,055 | B1* | 8/2020 | Grisby | G06F 16/254 |
| 10,826,685 | B1* | 11/2020 | Campagna | H04L 9/3247 |
| 10,891,377 | B2* | 1/2021 | El-Moussa | G06F 21/568 |
| 10,902,062 | B1* | 1/2021 | Guha | G06F 16/9027 |
| 11,062,042 | B1* | 7/2021 | McKervey | G06F 16/137 |
| 11,188,571 | B1* | 11/2021 | Chen | G06F 16/2246 |
| 11,256,759 | B1* | 2/2022 | Chen | G06F 16/9024 |
| 11,310,253 | B1* | 4/2022 | Shah | G06F 11/3006 |
| 11,392,541 | B2* | 7/2022 | Bhattacharya | G06F 16/9027 |
| 11,416,465 | B1* | 8/2022 | Anwar | G06F 16/285 |
| 11,496,493 | B2* | 11/2022 | Tang | H04L 41/142 |
| 11,509,671 | B2* | 11/2022 | Servajean | G06N 3/045 |
| 11,645,293 | B2* | 5/2023 | Pelloin | G06F 18/2433 706/11 |
| 11,657,147 | B1* | 5/2023 | Ni | G06F 21/561 726/23 |
| 11,741,133 | B1* | 8/2023 | Romano | G06F 3/04842 707/705 |
| 11,861,335 | B1* | 1/2024 | Margolin | G06N 20/00 |
| 2003/0031167 | A1* | 2/2003 | Singh | H04L 45/04 370/408 |
| 2004/0199792 | A1* | 10/2004 | Tan | H04L 41/0893 726/12 |
| 2004/0205058 | A1* | 10/2004 | Kiji | G06Q 10/10 |
| 2005/0076328 | A1* | 4/2005 | Berenbach | G06F 8/10 717/104 |
| 2006/0059027 | A1* | 3/2006 | Berenbach | G06Q 10/04 717/104 |
| 2006/0098018 | A1* | 5/2006 | Tarditi | G06T 15/005 345/505 |
| 2006/0098019 | A1* | 5/2006 | Tarditi | G06T 15/005 345/505 |
| 2008/0109730 | A1* | 5/2008 | Coffman | G06Q 30/02 715/733 |
| 2009/0046862 | A1* | 2/2009 | Ito | H04L 9/088 380/277 |
| 2009/0217248 | A1* | 8/2009 | Bently | G06F 8/30 717/132 |
| 2009/0234899 | A1* | 9/2009 | Kramer | G06F 16/2465 708/200 |
| 2010/0094590 | A1* | 4/2010 | Ozonat | G06F 11/3409 702/179 |
| 2011/0078189 | A1* | 3/2011 | Bonchi | G06F 16/258 707/776 |
| 2011/0307507 | A1* | 12/2011 | Zhou | G06F 8/74 707/769 |
| 2012/0136909 | A1* | 5/2012 | Wang | G06F 21/552 708/204 |
| 2013/0018919 | A1* | 1/2013 | Peek | G06F 16/24549 707/E17.014 |
| 2013/0318616 | A1* | 11/2013 | Christodorescu | G06F 21/552 726/25 |
| 2015/0020199 | A1* | 1/2015 | Neil | H04L 63/1408 726/23 |
| 2015/0026103 | A1* | 1/2015 | Goldschmidt | G06N 7/01 706/12 |
| 2015/0234875 | A1* | 8/2015 | Huang | G06F 16/2237 707/743 |
| 2015/0269230 | A1* | 9/2015 | Kardes | G06Q 50/01 707/692 |
| 2015/0324410 | A1* | 11/2015 | Glover | G06F 16/9024 707/610 |
| 2016/0020956 | A1* | 1/2016 | Naiem | H04L 41/046 370/351 |
| 2016/0048681 | A1* | 2/2016 | Fang | G06F 21/56 726/23 |
| 2016/0092774 | A1* | 3/2016 | Wang | H04L 67/535 706/46 |
| 2016/0205000 | A1* | 7/2016 | Zhen | H04L 41/147 709/224 |
| 2016/0292300 | A1* | 10/2016 | Bhatia | H04L 45/12 |
| 2016/0308725 | A1* | 10/2016 | Tang | H04L 63/0421 |
| 2016/0308900 | A1* | 10/2016 | Sadika | H04L 63/1441 |
| 2017/0011382 | A1* | 1/2017 | Zoldi | G06Q 40/04 |
| 2017/0068747 | A1* | 3/2017 | Qi | G06F 11/3452 |
| 2017/0109221 | A1* | 4/2017 | Caffrey | G06F 11/0751 |
| 2017/0149639 | A1* | 5/2017 | Vasseur | H04L 41/0677 |
| 2017/0236123 | A1* | 8/2017 | Ali | G06Q 20/3825 705/75 |
| 2018/0027004 | A1* | 1/2018 | Huang | H04L 43/04 726/23 |
| 2018/0060038 | A1* | 3/2018 | Serrano | G06F 17/10 |
| 2018/0069885 | A1* | 3/2018 | Patterson | G06F 16/27 |
| 2018/0174062 | A1* | 6/2018 | Simo | G06N 3/08 |
| 2018/0189416 | A1* | 7/2018 | Lee | G06T 11/206 |
| 2018/0198805 | A1* | 7/2018 | Vejman | H04L 63/14 |
| 2018/0324199 | A1* | 11/2018 | Crotinger | G06F 16/285 |
| 2018/0329958 | A1* | 11/2018 | Choudhury | G06F 16/2456 |
| 2018/0336437 | A1* | 11/2018 | Cheng | G06F 18/2433 |
| 2018/0367414 | A1* | 12/2018 | Raghavendra | H04L 43/04 |
| 2019/0042618 | A1* | 2/2019 | Potulska | G06N 5/01 |
| 2019/0102276 | A1* | 4/2019 | Dang | G06F 18/24155 |
| 2019/0205558 | A1* | 7/2019 | Gonzales, Jr. | G06F 21/602 |
| 2019/0251180 | A1* | 8/2019 | Lachambre | G06F 16/258 |
| 2019/0286504 | A1* | 9/2019 | Muntés-Mulero | G06F 11/0709 |
| 2019/0286757 | A1* | 9/2019 | Muntés-Mulero | G06F 11/079 |
| 2019/0363937 | A1* | 11/2019 | Branquinho Teresa Maria | H04L 41/14 |
| 2019/0379589 | A1* | 12/2019 | Ryan | G06F 17/142 |
| 2020/0065939 | A1* | 2/2020 | Kim | G06T 11/206 |
| 2020/0076840 | A1* | 3/2020 | Peinador | G06F 21/552 |
| 2020/0076841 | A1* | 3/2020 | Hajimirsadeghi | G06F 18/2136 |
| 2020/0076842 | A1* | 3/2020 | Zhou | G06N 3/045 |
| 2020/0082013 | A1* | 3/2020 | Triplet | G06N 5/022 |
| 2020/0136923 | A1* | 4/2020 | Altshuler | H04W 4/08 |
| 2020/0142957 | A1* | 5/2020 | Patra | G06N 3/04 |
| 2020/0233864 | A1* | 7/2020 | Jin | G06F 16/288 |
| 2020/0242039 | A1* | 7/2020 | Shani | H04L 9/0643 |
| 2020/0364128 | A1* | 11/2020 | Vittal | G06F 9/45558 |
| 2020/0366690 | A1* | 11/2020 | Cheng | G06N 3/08 |
| 2020/0387797 | A1* | 12/2020 | Ryan | G06N 3/084 |
| 2020/0401470 | A1* | 12/2020 | Jung | G06N 7/01 |
| 2020/0401625 | A1* | 12/2020 | Wright | G06F 16/90335 |
| 2021/0021616 | A1* | 1/2021 | Shabtai | H04L 63/145 |
| 2021/0064751 | A1* | 3/2021 | Li | G06F 18/2413 |
| 2021/0067527 | A1* | 3/2021 | Chen | G06N 3/08 |
| 2021/0124983 | A1* | 4/2021 | Axenie | G06N 20/00 |
| 2021/0142161 | A1* | 5/2021 | Huang | G06F 16/212 |
| 2021/0144088 | A1* | 5/2021 | Ziv | H04L 45/033 |

(56) References Cited

U.S. PATENT DOCUMENTS

| | | | | |
|---|---|---|---|---|
| 2021/0157858 A1* | 5/2021 | Stevens | ............... | G06F 40/279 |
| 2021/0194907 A1* | 6/2021 | Bertiger | ............. | H04L 43/0811 |
| 2021/0320847 A1* | 10/2021 | Altshuler | ............ | G06Q 10/063 |
| 2021/0357681 A1* | 11/2021 | Wu | .................... | G06F 18/2411 |
| 2021/0365643 A1* | 11/2021 | Agrawal | ............... | G06N 20/00 |
| 2021/0374143 A1* | 12/2021 | Neill | ................ | G06F 16/24568 |
| 2021/0406288 A1* | 12/2021 | Wright | .................. | G06N 20/00 |
| 2022/0043811 A1* | 2/2022 | Salvat Lozano | .... | G06F 16/9024 |
| 2022/0070266 A1* | 3/2022 | Rossi | ..................... | G06F 17/18 |
| 2022/0092224 A1* | 3/2022 | Yamada | ............. | G06F 16/2365 |
| 2022/0138204 A1* | 5/2022 | Graves | ............... | G11C 27/005 |
| | | | | 707/694 |
| 2022/0172067 A1* | 6/2022 | Kang | ..................... | G06N 3/088 |
| 2022/0179730 A1* | 6/2022 | Chan | .................... | G06F 11/0787 |
| 2022/0180240 A1* | 6/2022 | Luo | ....................... | G06N 3/047 |
| 2022/0197917 A1* | 6/2022 | Schneuwly | ........... | G06F 21/554 |
| 2022/0198294 A1* | 6/2022 | Schneuwly | ....... | G06F 16/24564 |
| 2022/0222590 A1* | 7/2022 | Wang | ................. | G06Q 30/0206 |
| 2022/0224711 A1* | 7/2022 | Singh | .................... | H04L 45/38 |
| 2022/0374292 A1* | 11/2022 | Jha | .......................... | G06F 9/542 |
| 2023/0138371 A1* | 5/2023 | Bandukwala | ....... | G06F 11/3616 |
| | | | | 714/38.1 |
| 2023/0351215 A1* | 11/2023 | Sun | ........................ | G06N 5/022 |

* cited by examiner 230  1) Growth: A specific index of a connected component may change between days, even if it shares nodes (e.g. connected components which only grew in size).

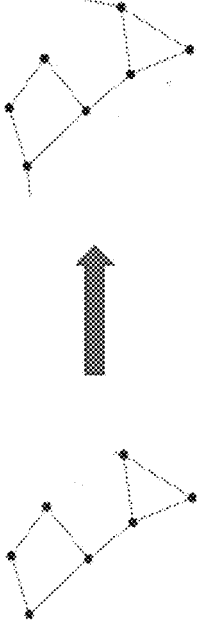

Timeframe = t-1
CC index = 5

Timeframe = t
CC index = 3

240  2) Merge: 2 connected components which were once separated may merge at any given day.

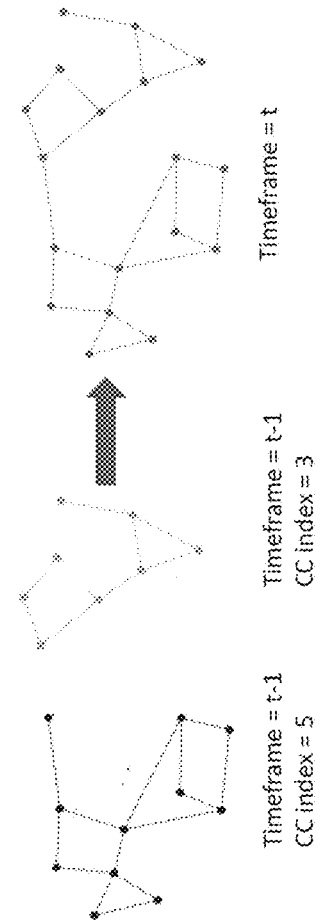

Timeframe = t-1
CC index = 5

Timeframe = t-1
CC index = 3

Timeframe = t 250  3) Entirely new connected components appeared at a specific date.

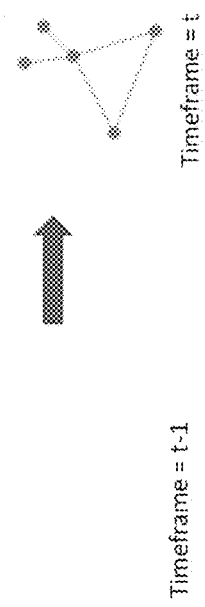

Timeframe = t-1

Timeframe = t

FEATURE EXTRACTION AND TIME SERIES ANOMALY DETECTION OVER DYNAMIC GRAPHS

BACKGROUND

A graph is a data structure wherein vertices (also called nodes or points) are interconnected by pairs known as edges (also called links, lines, or arrows). The pairs can be unordered or ordered (i.e., directional). The edges define relationships between vertices, for example showing how data changes over time. Graphs often include connected components, which are subgraphs in which any two or more vertices are connected to each other by edges and are connected to no additional vertices in the rest of the graph.

Graphs are common data structures which can be used across many real-world applications, such as social networks, connections between users of a product, navigation through streets (e.g., using map applications), pandemic spread in a population, etc. In all these use cases, the graphs will change over time and can be considered as dynamic graphs. Connected components can appear, change, and disappear within dynamic graphs over time, sometimes indicating anomalous behavior within the system being represented by the graph. It would be very useful to be able to leverage time series data expressed by the dynamic graphs to detect anomalies (e.g., exponential growth of a specific area could indicate emerging fraudulent activity, anomalous traffic congestion, disease outbreak areas, etc.). One challenge is that time series anomaly detection algorithms generally cannot take a graph as input, as these algorithms process numerical time series data.

BRIEF DESCRIPTIONS OF THE DRAWINGS

FIGS. 2A-2B show example graph evolutions according to some embodiments of the disclosure.

DETAILED DESCRIPTION OF SEVERAL EMBODIMENTS

Embodiments described herein can build a dynamic graph, create a data structure to map connected components of the dynamic graph between time frames, and track the changes in the connected components over time (e.g., through merges, growth in size, formation of new connected components, etc.). The entire process can be done incrementally (e.g., only adding the new nodes and edges created in every time frame) in order to omit the need to build a full-scale graph at every time frame. The latest graph is saved at every time frame, along with a compact representation describing the changes in the connected components over time. Then, this data is used to generate a time series data set that can be input to time series anomaly detection algorithms, allowing these algorithms to effectively process the data from the dynamic graph.

The disclosed embodiments provide highly efficient processing of very large-scale data sets. For example, in a dynamic graph, nodes can be added and new connections between existing nodes can be formed over time. This can create a situation where two connected components are merged at a specific time frame. Therefore, there is no one-to-one mapping between the indices of the connected components over time. However, creating a graph for every time frame over and over again (meaning at day 10, ten graphs need to be created or saved and loaded from memory) is not computationally feasible when dealing with large scale graphs. In contrast, the incremental approach described herein is much more computationally efficient. By constructing a graph from tabular data and then calculating the connected components within the graph, the incremental approach can provide an explanation of the change in connected components over time from a single graph, that of a most recent time frame, rather than requiring every graph from time t=1 to time t=1+(present time).

The disclosed embodiments also enable graph data to be processed using time series algorithms. Conversion of dynamic graph data to time series data using the disclosed approaches involves generating an entirely new data set (time series data) from a source data set (dynamic graph data), effectively translating the source data set into a form that can be used by a system that requires inputs in a different format altogether. Specifically, time-series anomaly detection can be performed based on dynamic graph data, allowing automatic anomaly detection to be applied to find problems in a much broader set of systems than ever before.

Figure 1:
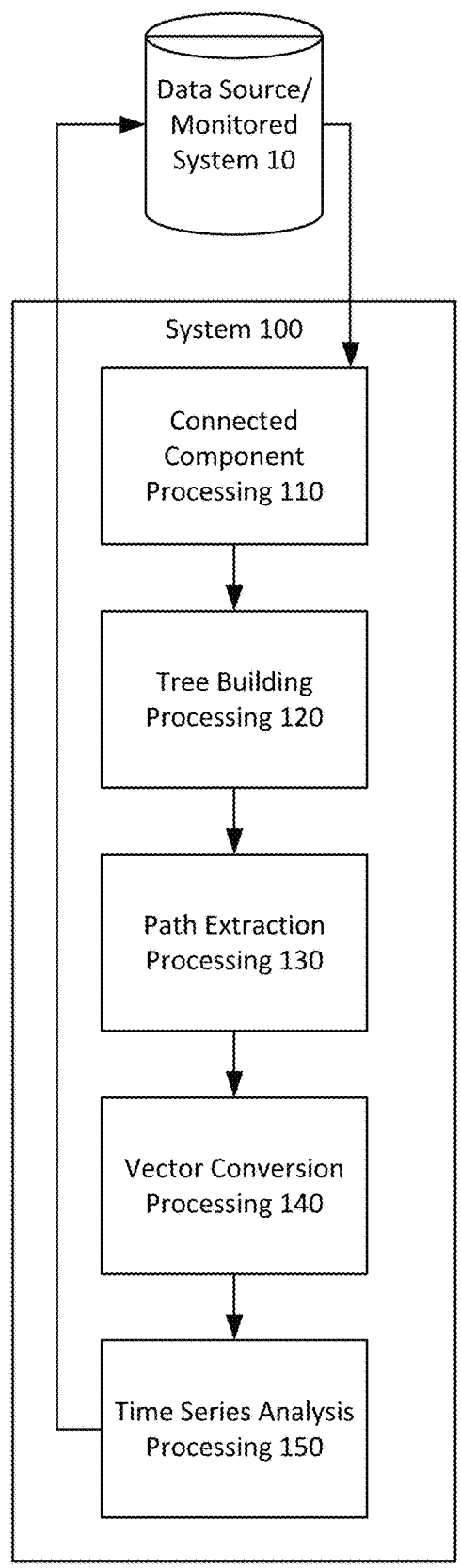
FIG. 1 shows an example feature extraction and time series anomaly detection system according to some embodiments of the disclosure.

FIG. 1 shows an example feature extraction and time series anomaly detection system 100 according to some embodiments of the disclosure. System 100 may include a variety of hardware, firmware, and/or software components that interact with one another and with data sources and/or monitored systems 10. For example, system 100 includes connected component processing 110, tree building processing 120, path extraction processing 130, vector conversion processing 140, and time series analysis processing 150, each of which may be implemented by one or more computers (e.g., as described below with respect to FIG. 11). As described in detail below, connected component processing 110 receives graph data (e.g., from a system being monitored 10, such as a computing network or population) and identify connected components therein. Once connected components are identified, tree building processing 120 can construct a tree including changes over time, path extraction processing 130 can extract relationships among the changes over time, and vector conversion processing 140 can turn the results into numeric vectors. Time series analysis processing 150 can use the numeric vectors as inputs to time series analysis algorithm(s) and, as a result, report on the status of monitored system 10 and/or control monitored system 10. FIGS. 2A-10 illustrate the functioning of system 100 in detail.

Data source/monitored system 10, system 100, and individual elements of system 100 (connected component processing 110, tree building processing 120, path extraction processing 130, vector conversion processing 140, and time series analysis processing 150) are each depicted as single blocks for ease of illustration, but those of ordinary skill in the art will appreciate that these may be embodied in different forms for different implementations. For example, system 100 may be provided by a single device or plural devices, and/or any or all of its components may be distributed across multiple devices. In another example, while connected component processing 110, tree building processing 120, path extraction processing 130, vector conversion processing 140, and time series analysis processing 150 are depicted separately, any combination of these elements may be part of a combined hardware, firmware, and/or software element. Moreover, while one data source/monitored system 10 is shown, in practice, the data source and the monitored system may be separate from one another and/or there may be multiple data sources, multiple monitored systems, or both.

Figure 2A:
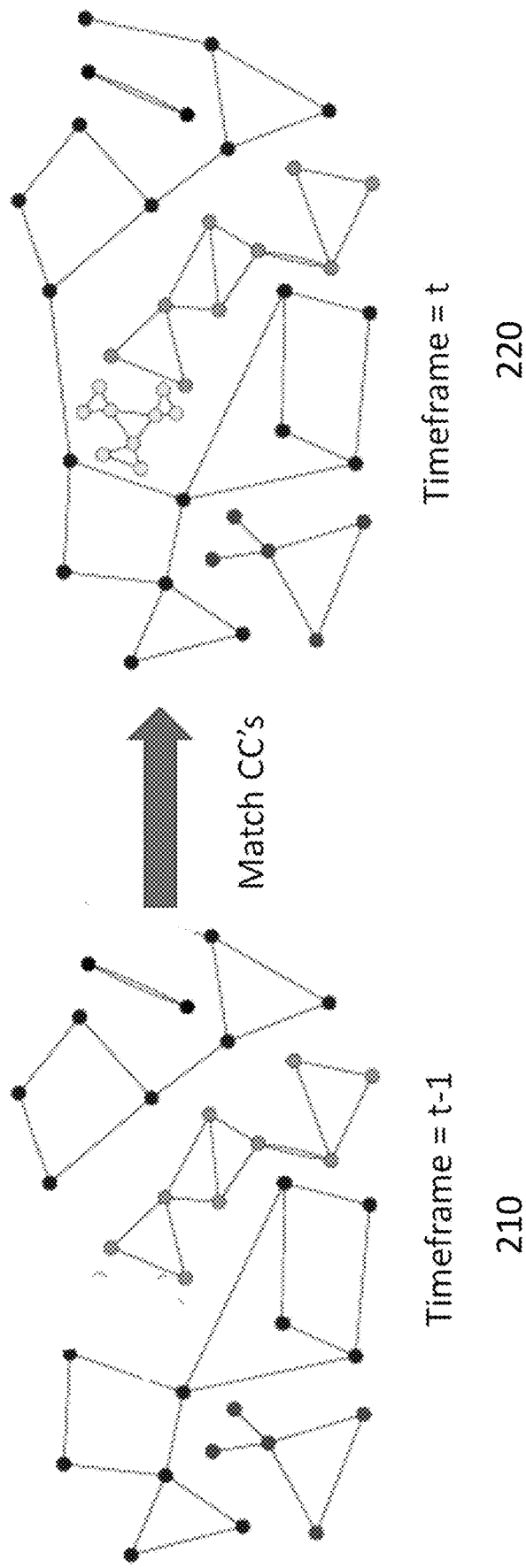

FIGS. 2A-2B show example graph evolutions according to some embodiments of the disclosure. These example graph evolutions are presented to describe the general concepts surrounding the evolution of a dynamic graph over time. Subsequent figures show how system 100 performs processing on dynamic graphs in view of the features shown in FIGS. 2A-2B.

FIG. 2A shows an example wherein a graph at time t−1 210 precedes a graph at time t 220. In this basic example, the graph at time t−1 210 has five connected components, and the graph at time t 220 has five connected components. However, the connected components are not the same. Between time t−1 and time t, two of the old connected components merged into one, and an entirely new connected component emerged.

FIG. 2B provides specific examples of how connected components can change over time. In a growth example 230, a connected component changes from time t−1 to time t by adding a node (i.e., growing in size). In a merge example 240, two connected components existing at time t−1 merge before time t, resulting in a new connected component at time t that is a combination of the nodes of the previous two connected components. In a new component example 250, an entirely new connected component appears between time t−1 and time t.

Figure 3A:
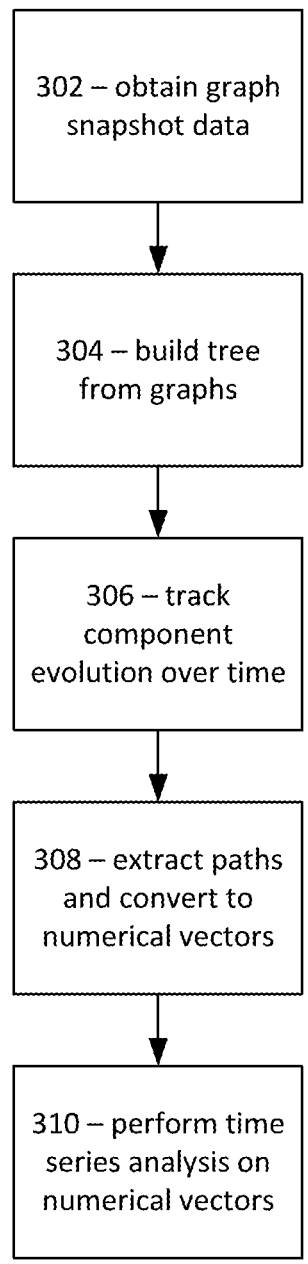
FIGS. 3A-3B show an example feature extraction and time series anomaly detection process according to some embodiments of the disclosure.
Figure 3B:
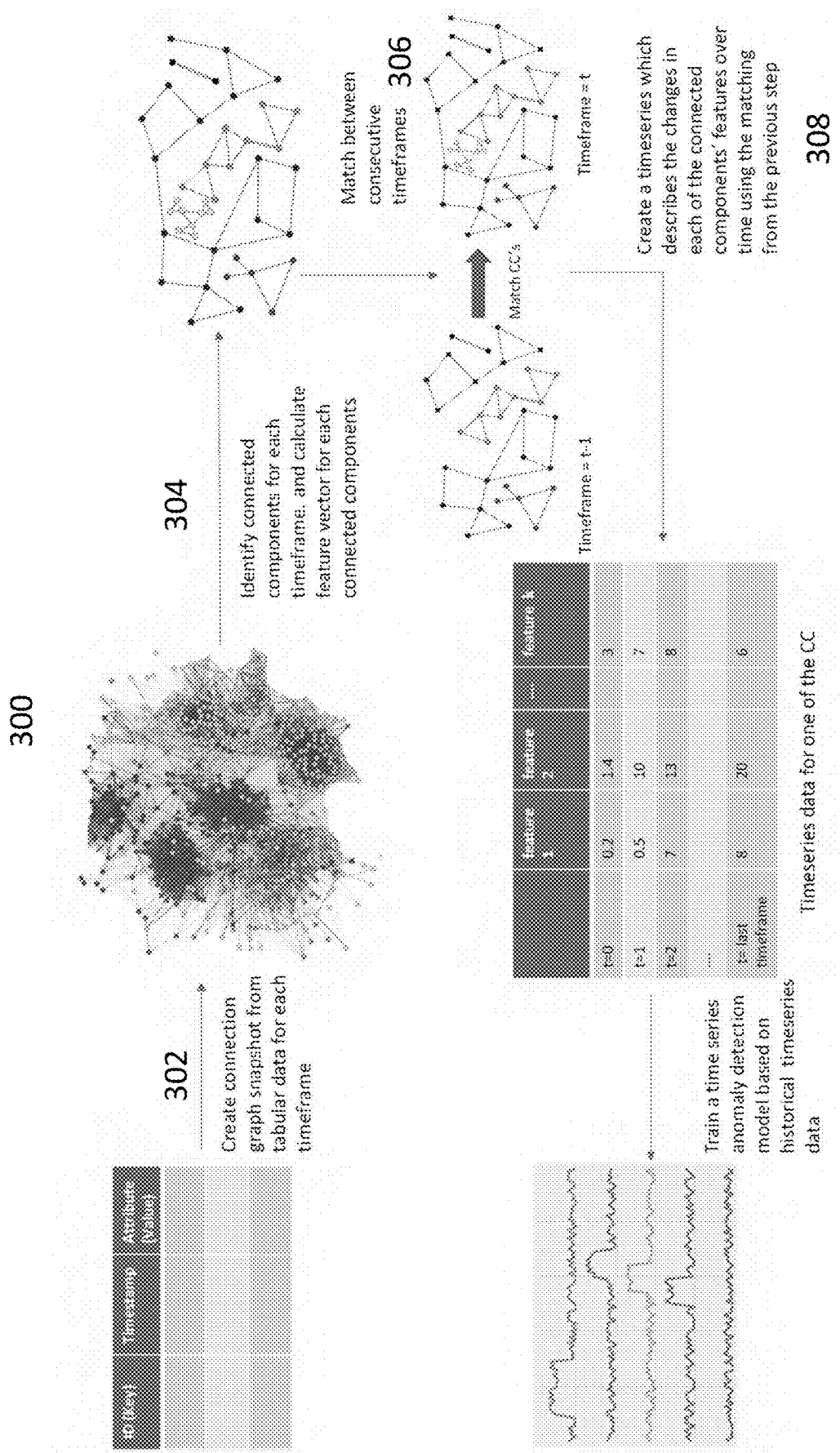

FIGS. 3A-3B show an example feature extraction and time series anomaly detection process 300 according to some embodiments of the disclosure. In view of the connected component behaviors in graph data sets, such as those illustrated above, system 100 can perform process 300 to create time-series data from graphs and use the time-series data to perform anomaly detection for the systems represented by the graphs.

At 302, system 100 receives data from data source/monitored system 10. In some embodiments, the data can include a plurality of graph snapshots for a plurality of consecutive periodic time samples. System 100 calculates connected components from the graph snapshots. For example, the graph snapshots can be for a plurality of time frames, and system 100 can receive these snapshots all at once or separately as time elapses. The graph snapshots include graphs at specific time frames having vertices and edges, and system 100 can map between connected components in consecutive graph snapshots. The graph snapshots can include data describing at least one feature of each connected component (e.g., at least one value or other data point for each vertex and/or edge). For example, as seen in FIG. 3B in particular, a vertex of a graph can have an ID, a timestamp, and an attribute value. The attributes can be anything that can be represented in a graph (e.g., descriptions of a node of a network, identifying information for a person infected with a communicable disease, etc.).

In some embodiments, the data received at 302 can be in tabular form (e.g., with columns of ID, timestamp, and attribute value and rows for specific entries as in the example of FIG. 3B, or any other table in other embodiments). In this case, system 100 can apply any known or proprietary connection graph generation algorithm to generate the graph snapshots.

At 304, system 100 builds a tree from the graph data obtained at 302. Given a set of periodic (e.g., daily) snapshots of a graph with connected components, system 100 may have data describing mapping between connected component IDs in consecutive snapshots, including indications of merges between different connected components (note that each connected component at time t can be a merge between several components from time t−1, remain the same size, or grow without a merge). System 100 may also have data describing additional features or attributes regarding each component (e.g., size, fraud ratio, average degree, number of edges, etc.). From these snapshots, system 100 can recursively build a tree tracking an evolution of one of the connected components through the plurality of graph snapshots, the tree including a root node representing the connected component at a final one of the consecutive periodic time samples and a plurality of leaf nodes branching from the root node.

Figure 4:
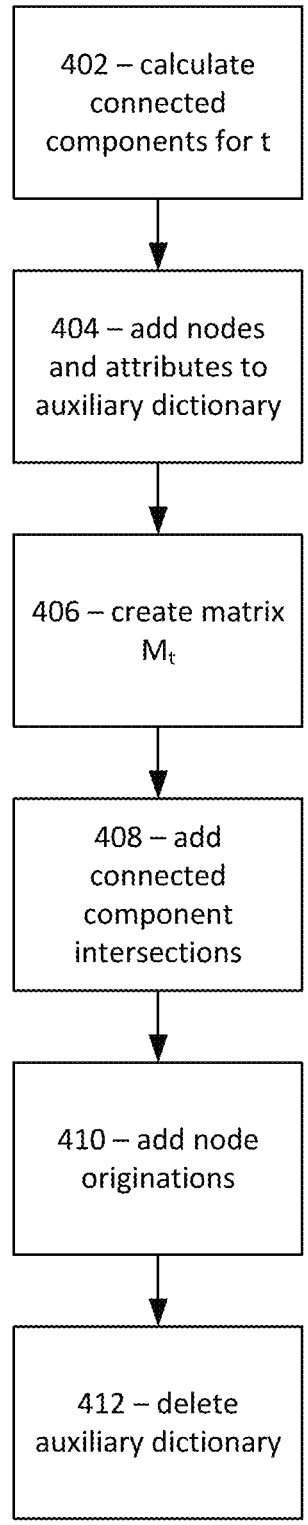
FIG. 4 shows an example tree building process according to some embodiments of the disclosure.
Figure 5A:
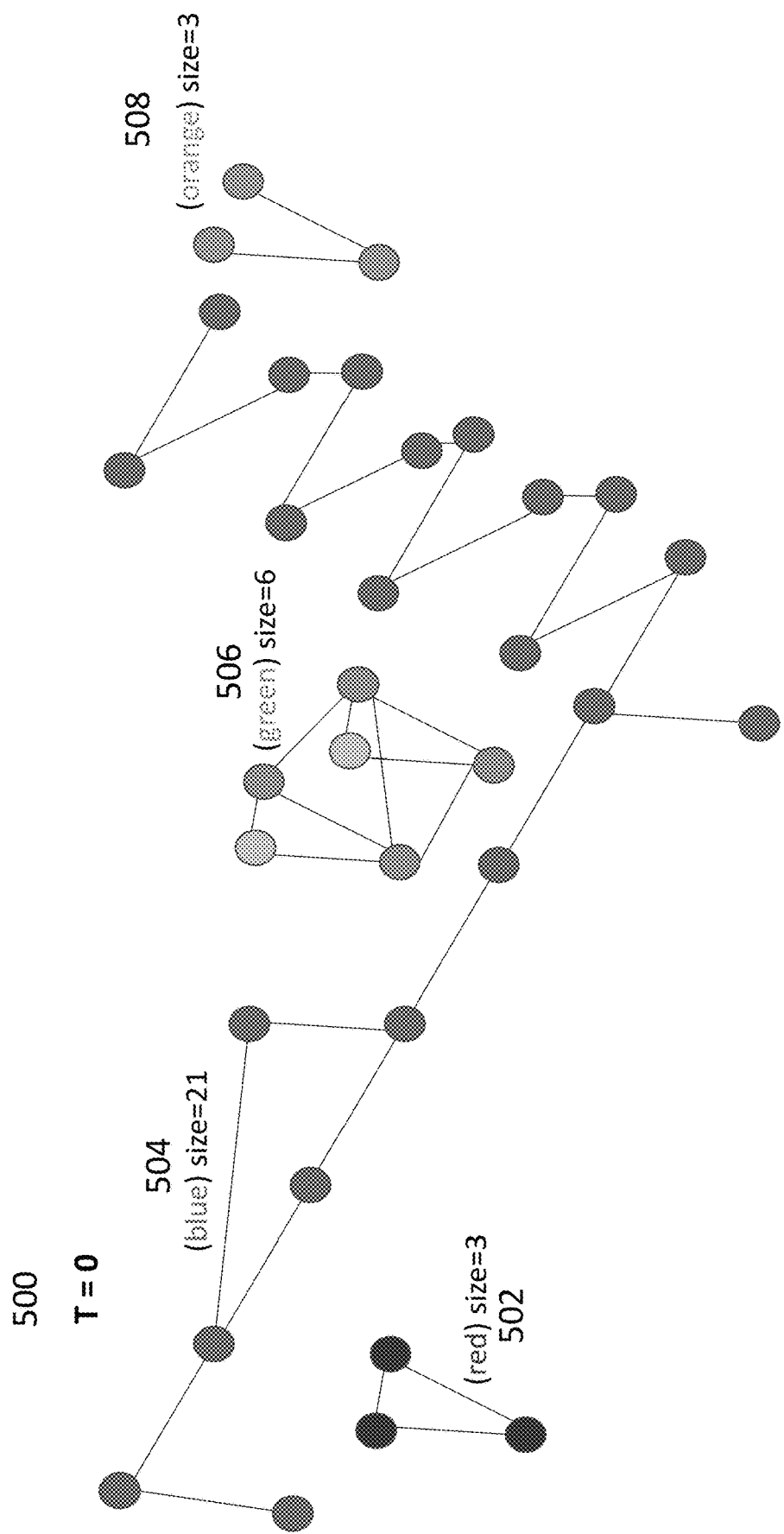
FIGS. 5A-5C show an example graph evolution according to some embodiments of the disclosure.
Figure 5B:
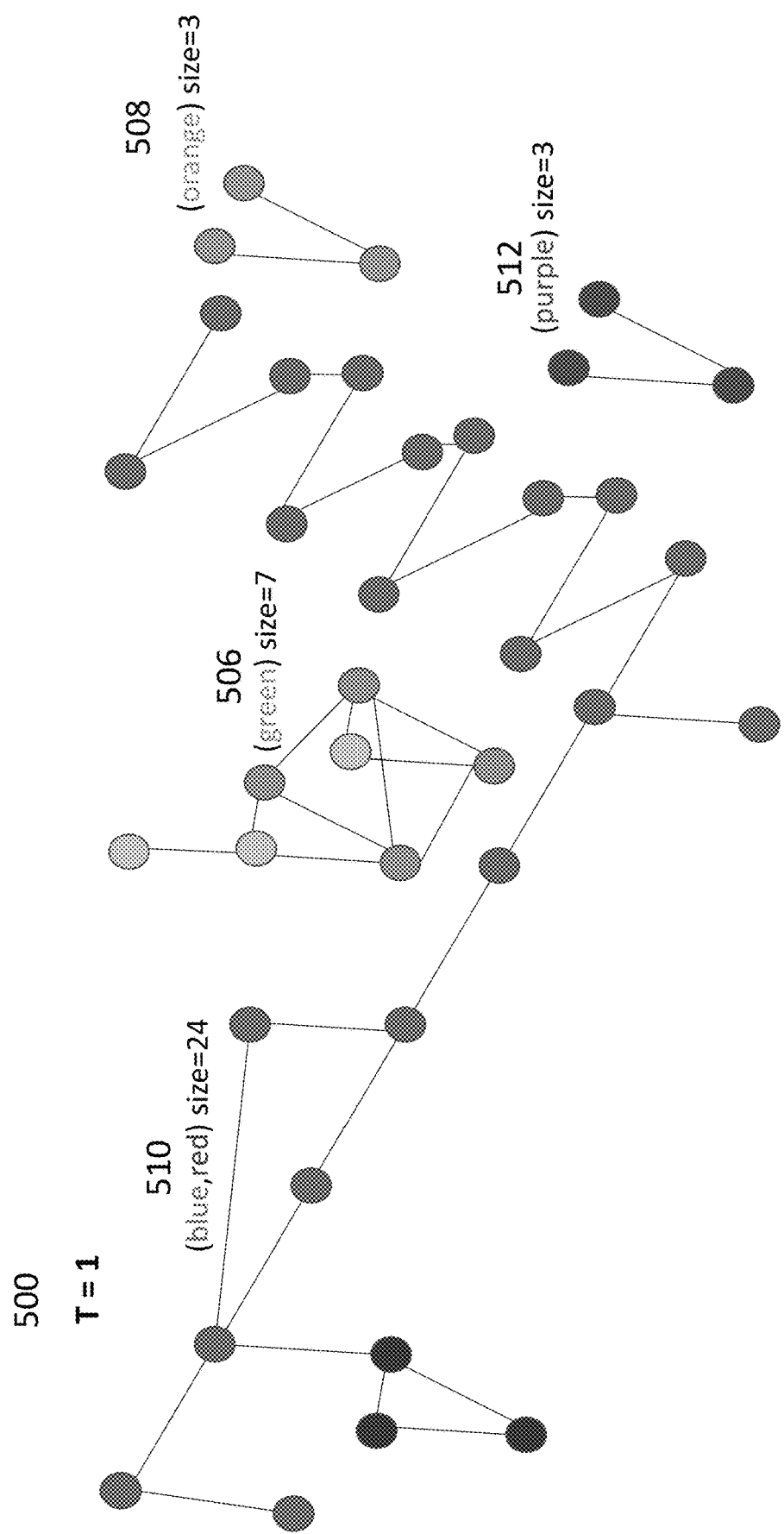
Figure 5C:
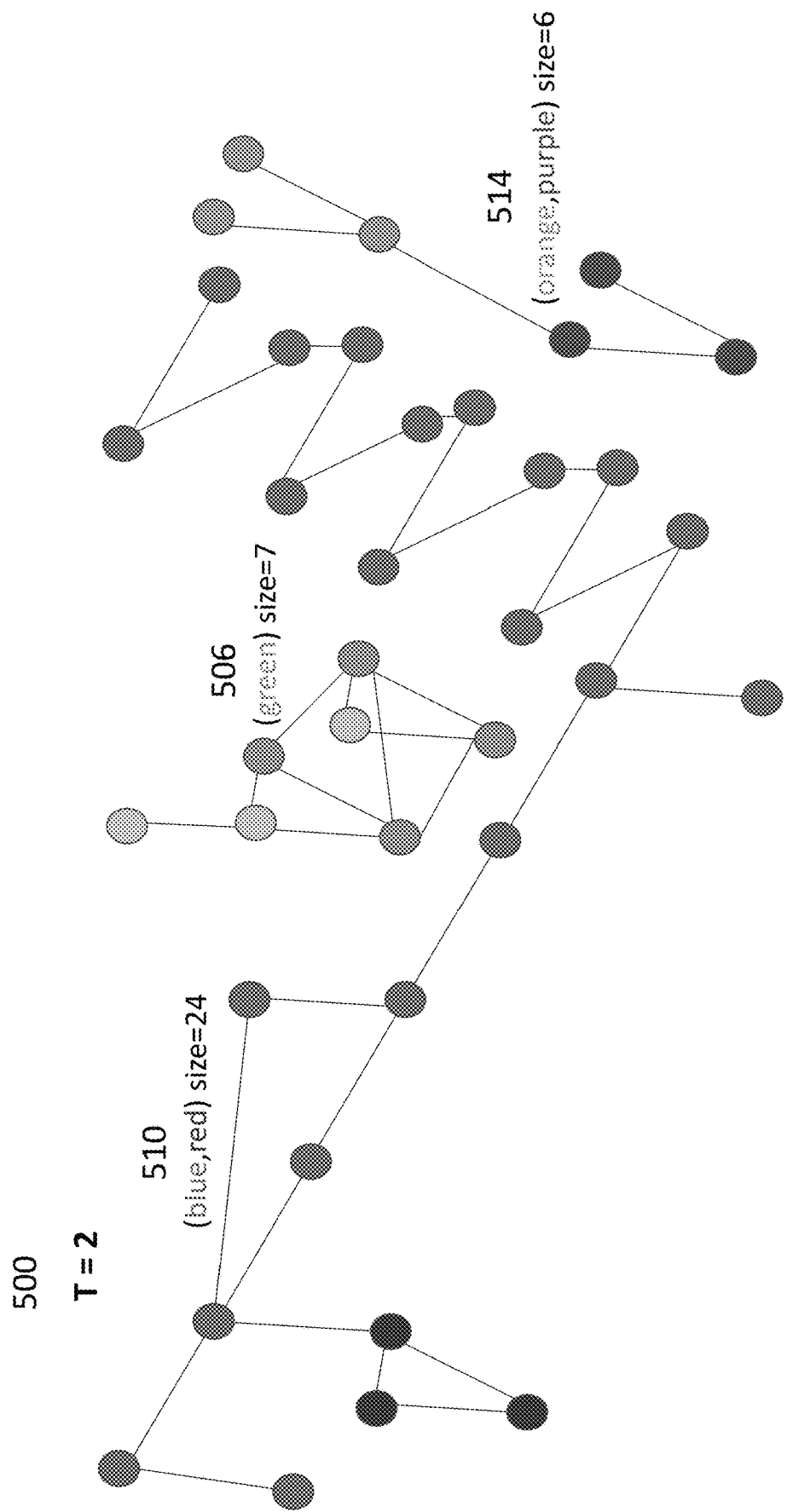
Figure 6:
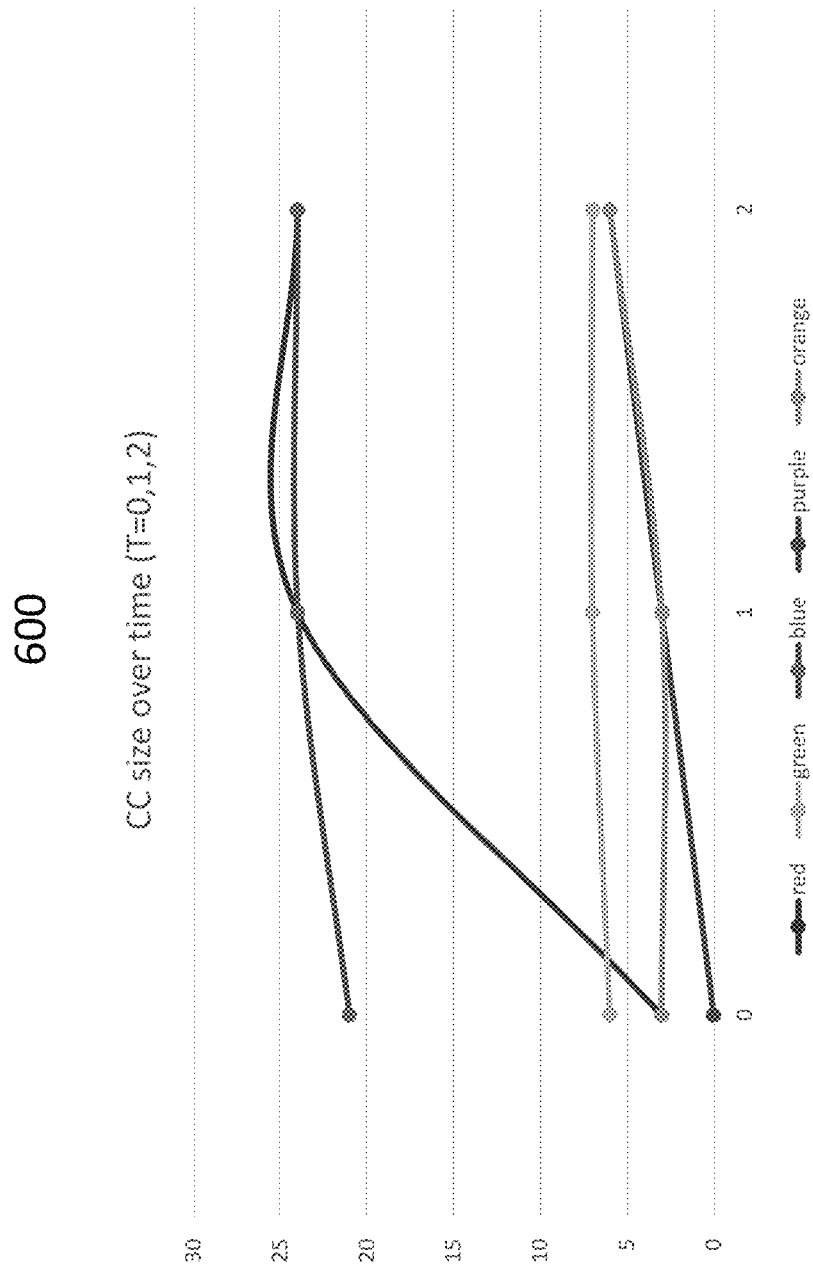
FIG. 6 shows an example chart of graph evolution according to some embodiments of the disclosure.
Figure 7:
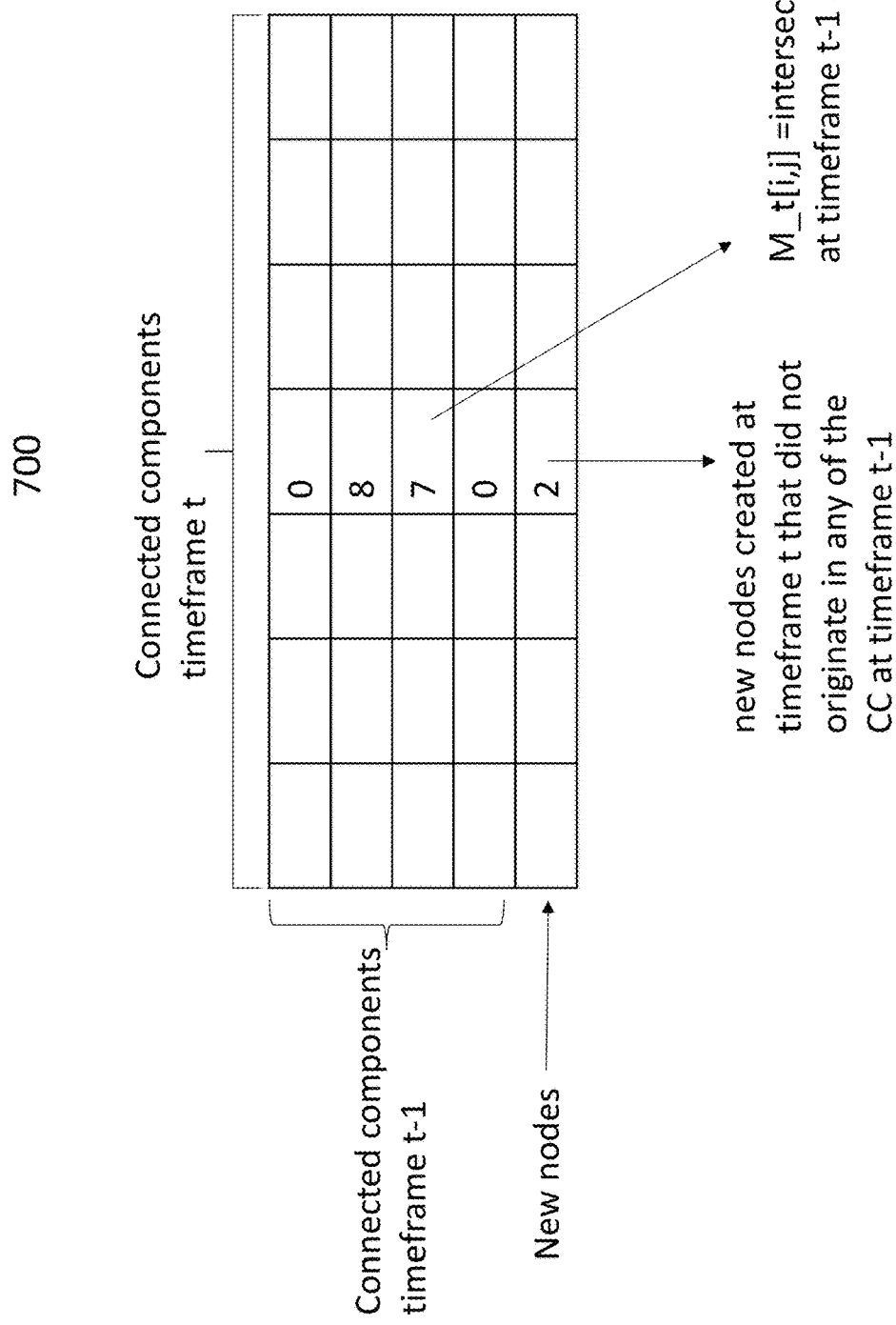
FIG. 7 shows an example matrix according to some embodiments of the disclosure.

FIG. 4 shows an example of processing performed at 304 according to some embodiments of the disclosure in detail. FIGS. 5A-5C illustrate an example graph evolution 500, FIG. 6 shows an example chart of graph evolution 600, and FIG. 7 shows an example matrix, according to some embodiments of the disclosure. The processing performed at 304 and 306 is explained as follows with reference to the processing illustrated in FIG. 4 and the examples of FIGS. 5A-7.

At 402, system 100 can calculate connected components for a given time t. For example, this begins at t=0 in matrix $M_0$. The matrix can have dimensions (1, number of connected components at t=0). As noted above, connected components are made up of connected nodes each having their own attributes. This is shown, for example, in FIG. 5A, which is a graph 500 at time t=0. This example graph has four connected components—red 502 with three nodes, blue 504 with 21 nodes, green 506 with six nodes, and orange 508 with three nodes. System 100 identifies these connected components from the graph data obtained at 302.

At 404, system 100 can add nodes and attributes to an auxiliary dictionary. The auxiliary dictionary is stored in a memory accessible to or part of system 100 and contains the set of nodes which belong to each connected component as well as any attributes or features being tracked (e.g., average degree, number of edges etc.). This data structure is bound in size by O (number of nodes) because the connected components are disjoint and can be created during the connected component calculation process (i.e., there may be as many connected components as nodes, at maximum). The auxiliary dictionary includes data describing, for each connected component, a set of nodes belonging to the connected component and the tracked feature(s) of the connected component. As described in further detail below, data describing the evolution of the tracked feature(s) of connected component through time is later constructed from the data in the auxiliary dictionary.

In the case where the time t is the first time being processed by system 100 for the monitored system 10, processing at this point may proceed to 306 as described below, with a newly-instantiated auxiliary dictionary. Otherwise, at 406, system 100 can proceed with update processing by creating a matrix $M_t$. In some embodiments, this matrix has the following dimensions: ((number of connected components at time frame t−1)+1, number of connected components at time frame t).

At 408, system 100 can add connected component intersections. In some embodiments, for every cell $M_t(i,j)$, system 100 fills in the intersection between the sets of connected component i at time t−1 and connected component j at time t using the auxiliary dictionaries for time t−1 and time t. This is computationally efficient, as i and j are keys in the dictionaries. $M_t(i,j)$ contains the attributes of the connected component i from time t−1 (from the dictionary) and the size of the intersection.

At 410, system 100 can add node originations. In some embodiments, for each connected component j at time frame t, system 100 saves (size of connected component j−sum ($M_t[:,j]$)) in $M_t[-1, j]$. This denotes the number of nodes which are part of j and not part of any connected component at time frame t−1.

An example of what can be identified by this processing can be seen by continuing the example of FIGS. 5A-5C. Specifically, FIG. 5B shows graph 500 at time t=1, and FIG. 5A shows graph 500 at time t=0. In terms of the processing done at time t=1, the graph of FIG. 5B is the set of connected components at time t, and the graph of FIG. 5A is the set of connected components at time t−1. At time t (t=1), red 502 and blue 504 have merged into blue-red 510 with 24 nodes, green 506 has added one node, orange 508 remains unchanged, and purple 512, with three nodes, has appeared. This information is stored in the auxiliary dictionary after processing at 410.

An example matrix 700 that can serve as an auxiliary dictionary is illustrated in FIG. 7. As shown in FIG. 7, each column contains connected components at time t, and each row contains connected components at time t−1 and/or new components not present at t−1 but that appeared by t. Thus, each intersection indicates an intersection size between connected components at the two times.

At 412, system 100 can delete auxiliary dictionary t−1, leaving the current auxiliary dictionary for time t which, as described above, encodes the changes in the connected components over time.

Figure 8:
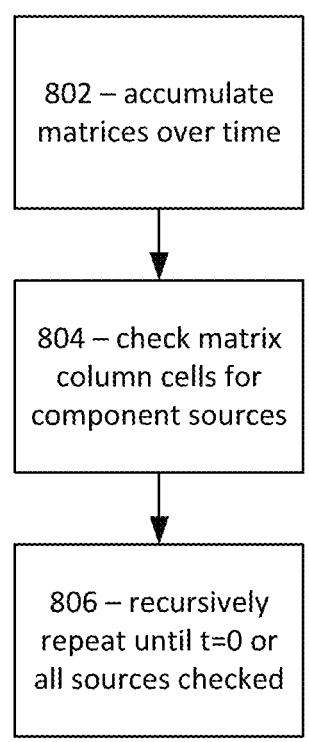
FIG. 8 shows an example component tracking process according to some embodiments of the disclosure.

Returning to FIGS. 3A-3B, at 306, system 100 can track connected component evolution over time. FIG. 8 shows an example component tracking process performed at 306 according to some embodiments of the disclosure.

At 802, system 100 can accumulate matrices over time. For some embodiments, this may be a set of matrices for a time period of interest. For example, system 100 can accumulate the matrices $M_0, \ldots, M_t$. This allows system 100 to easily track the changes in attributes for each of the connected components from time 0 until time t. Due to the processing performed as described above to build each matrix, no other data may be required in order to track the changes in attributes.

At 804, system 100 can check matrix column cells for component sources. As the matrices encode relationships between cells over time, system 100 needs only to check the matrices to determine connected component histories. For example, to track connected component k from time t over time until time 0, system 100 can proceed as follows. For each connected component i at time t, check column i in matrix $M_t$ and locate all the non-zero cells in this column (including the last row). Non-zero cells are denoted as "sources" of the connected component at time t−1. For example, if row j ($M_t[j,i]$) is non-zero, this means that connected component j from time t−1 is one of the sources of connected component i from time t. If the last row is non-zero, it means that there are nodes in connected component i which are new and therefore sourceless.

At 806, system 100 can recursively repeat checking matrix column cells for component sources until t=0 or all sources are checked. In other words, the processing at 804 can be performed between any two consecutive time frames until time 0 or until there are no sources (the sum of the column excluding the last row is 0).

To visualize the recursive repetition of the aforementioned processing, the example of FIGS. 5A-5C is further extended. FIG. 5C shows graph 500 at time t=2, FIG. 5B shows graph 500 at time t=1, and FIG. 5A shows graph 500 at time t=0. As discussed above, in terms of the processing done at time t=1, the graph of FIG. 5B is the set of connected components at time t, and the graph of FIG. 5A is the set of connected components at time t−1. After another recursion, in terms of the processing done at time t=2, the graph of FIG. 5C is the set of connected components at time t, and the graph of FIG. 5B is the set of connected components at time t−1. At time t (t=2), green 506 and blue-red 510 are unchanged, while orange 508 and purple 512 have merged into orange-purple with six nodes. These changes over time are tracked by system 100 by processing at 306 over time using only the matrices.

FIG. 6 reframes the graph 500 of FIGS. 5A-5C into a chart 600, visually illustrating the changes to the connected components over time. As seen in the chart, components appear after an earliest time in some cases (e.g., purple, with 0 nodes at time t=0), grow in some cases, and merge (e.g., where lines overlap such as blue-red and orange-purple). This is a visual representation useful to a human to understand monitored system 10. However, this representation is not useful for time series analysis. In contrast, the above processing performed by system 100 encodes all of the same information in chart 600 (including, in some cases, further information). The information is encoded efficiently compared with maintaining full sets of graphs 500. Moreover, the information is ready for further processing, described below, to prepare it for use in time series algorithms (e.g., for anomaly detection).

Figure 9:
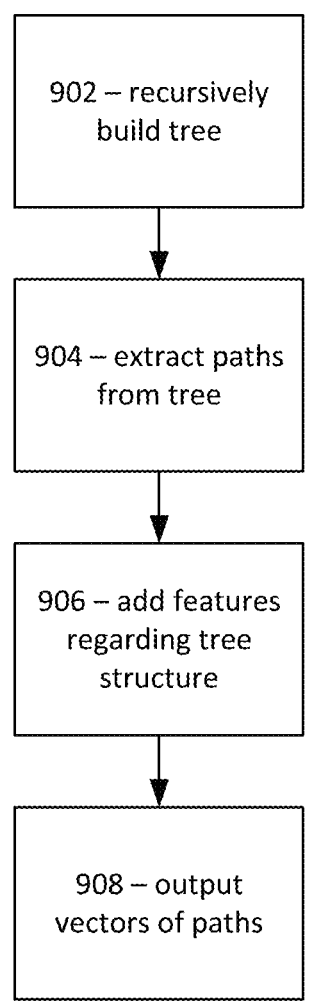
FIG. 9 shows an example vector creation process according to some embodiments of the disclosure.

Returning to FIGS. 3A-3B, at 308, system 100 can extract paths from the accumulated matrices and convert the paths to numerical vectors. FIG. 9 shows an example vector creation process performed at 308 according to some embodiments of the disclosure.

At 902, system 100 can recursively build a tree from the data generated at 306. In some embodiments, recursively building a tree starts with system 100 associating one or more features from t−1 in the matrix for time t with a root node of the tree being built. System 100 can then identify all connected components from t−1 that were merged to create the root node from the outcome of processing at 306. Then, for each of the identified connected components, system 100 creates a tree node and attaches the tree node to the root node as a child. System 100 recursively performs the associating, identifying, and creating steps until the first time (t=0) is reached or all identified connected components for the path are of size 0.

This process identifies all connected components from the previous time frame which were merged to create the connected component. For each one of the connected components from the previous time, system 100 creates a tree node and attach it to the root as a child (including the features). System 100 recursively expands the root's children (going back one time frame in each step) until one of two things occur—the first time frame (time=0) is reached, or the connected component is of size 0 (different connected components can be created at different times). The final product of this process is a tree, where every level represents a time frame. The root represents the connected component in its final state, and tracking all the paths from the root shows how it was created over the course of time.

At 904, system 100 can extract paths from the tree created at 902, where a path is a traversal of the tree from the root to one of the leaves. System 100 extracts paths by traversing the tree from the root node to one of the leaf nodes and generating the path such that the path contains data describing an evolution of a connected component through time as indicated by evolution of one or more features of the connected component. For example, this can be accomplished by system 100 executing a depth first search (DFS) algorithm or similar algorithm on the tree. A DFS algorithm will extract all the different paths in the tree.

At 906, system 100 can add features regarding the tree structure to the extracted paths from 904. For example, system 100 can add data to each path indicating whether there was a merge event, whether a component emerged at a given time, whether the component grew and by what degree, etc.

At 908, system 100 can create and output vectors of the paths extracted at 904 and enriched at 906. System 100 can convert each of the plurality of paths into a respective numerical vector of a plurality of numerical vectors representing the total set of paths for the tree. Each path creates a numerical vector tracking the change over time of a single connected component. These features include attributes of the connected component and attributes of the tree, which were obtained as described above. For example, each of the respective numerical vectors includes the features of the connected component to which it pertains and data describing each node in the path and how the nodes are interconnected. These vectors can be used for time-series processing as described in the following examples.

Figure 10:
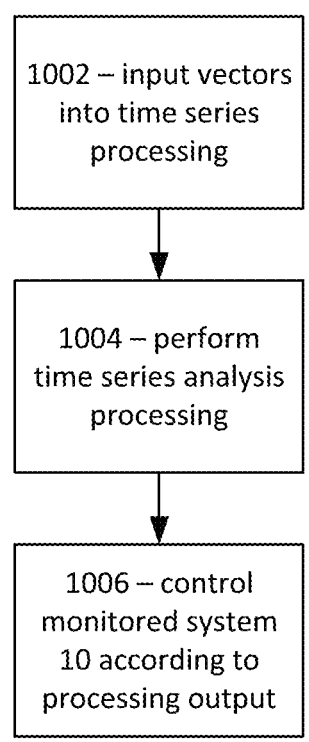
FIG. 10 shows an example time series analysis and output process according to some embodiments of the disclosure.

Returning to FIGS. 3A-3B, at 310, system 100 can perform time series analysis on the numerical vectors obtained at 308. FIG. 10 shows an example time series analysis and output process performed at 310 according to some embodiments of the disclosure.

At 1002, system 100 can provide the plurality of numerical vectors from 308 as inputs to a time series processing algorithm, such as an anomaly detection algorithm. While the following example presumes system 100 executes the time-series anomaly detection algorithm, in other embodiments, system 100 may output the plurality of numerical vectors to another processor or computer for processing. The data generated at 308 is in suitable condition for time-series processing by system 100 internally or externally by another system.

At 1004, system 100 can perform time-series analysis processing, for example by executing the time-series anomaly detection algorithm. The time-series algorithm, whether used for anomaly detection or to perform other analysis, can be a supervised or unsupervised machine learning algorithm. Example anomaly detection algorithms include, but are not limited to, autoregressive integrated moving average (ARIMA), vector autoregressive moving average model with exogenous variables (VARMAX), and long short-term memory (LSTM). In some embodiments, system 100 can feed a large data set into the algorithm to train the algorithm and, subsequently, use the algorithm on future time snapshots processed as described above to detect anomalies based on deviations from the normal behavior as understood by the trained model in ways that are understood by those of ordinary skill in the art. In other embodiments, the model may already be trained, and system 100 can execute the time series anomaly detection algorithm on the plurality of numerical vectors to detect at least one security anomaly or other anomaly in the monitored system 10. In any case, and for any algorithm chosen, the fact that graph data has been converted to numerical vectors makes the processing at 1004 possible.

At 1006, system 100 can provide feedback and/or directly control monitored system 10 according to the outcome of time-series analysis processing at 1004. For example, if one or more anomalies are detected at 1004, system 100 can alert a user to a potential fraud or other issue, shut down or block access to monitored system 10 to prevent an attack or other failure, cause a setting of monitored system 10 to be adjusted to attempt to revert its behavior to a normal state, etc.

Figure 11:
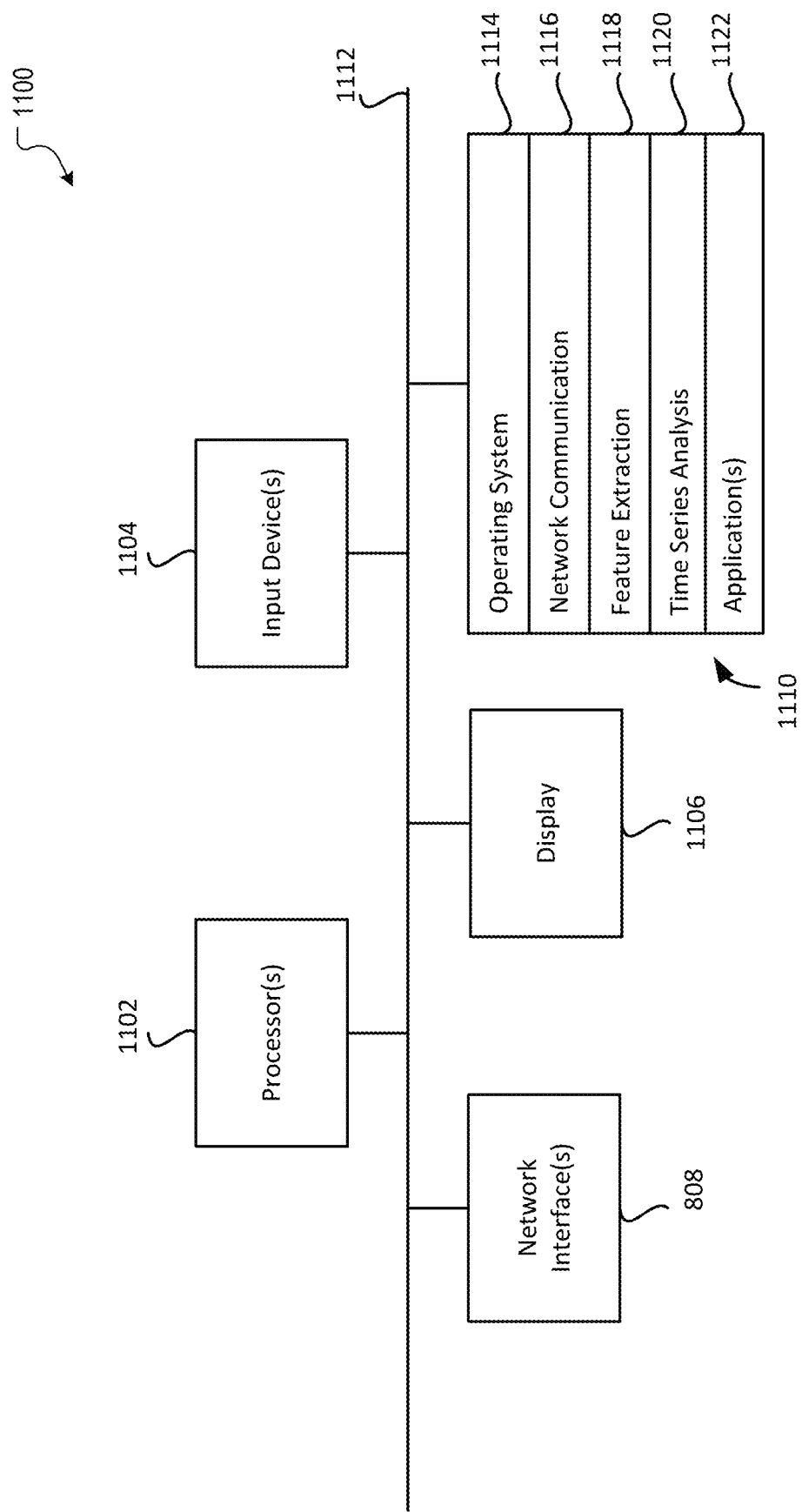
FIG. 11 shows a computing device according to some embodiments of the disclosure.

FIG. 11 shows a computing device 1100 according to some embodiments of the disclosure. For example, computing device 1100 may function as system 100 or any portion(s) thereof, or multiple computing devices 1100 may function as system 100.

Computing device 1100 may be implemented on any electronic device that runs software applications derived from compiled instructions, including without limitation personal computers, servers, smart phones, media players, electronic tablets, game consoles, email devices, etc. In some implementations, computing device 1100 may include one or more processors 1102, one or more input devices 1104, one or more display devices 1106, one or more network interfaces 1108, and one or more computer-readable mediums 1110. Each of these components may be coupled by bus 1112, and in some embodiments, these components may be distributed among multiple physical locations and coupled by a network.

Display device 1106 may be any known display technology, including but not limited to display devices using Liquid Crystal Display (LCD) or Light Emitting Diode (LED) technology. Processor(s) 1102 may use any known processor technology, including but not limited to graphics processors and multi-core processors. Input device 1104 may be any known input device technology, including but not limited to a keyboard (including a virtual keyboard), mouse, track ball, and touch-sensitive pad or display. Bus 1112 may be any known internal or external bus technology, including but not limited to ISA, EISA, PCI, PCI Express, NuBus, USB, Serial ATA or FireWire. In some embodiments, some or all devices shown as coupled by bus 1112 may not be coupled to one another by a physical bus, but by a network connection, for example. Computer-readable medium 1110 may be any medium that participates in providing instructions to processor(s) 1102 for execution, including without limitation, non-volatile storage media (e.g., optical disks, magnetic disks, flash drives, etc.), or volatile media (e.g., SDRAM, ROM, etc.).

Computer-readable medium 1110 may include various instructions 1114 for implementing an operating system (e.g., Mac OS®, Windows®, Linux). The operating system may be multi-user, multiprocessing, multitasking, multi-threading, real-time, and the like. The operating system may perform basic tasks, including but not limited to: recognizing input from input device 1104; sending output to display device 1106; keeping track of files and directories on computer-readable medium 1110; controlling peripheral devices (e.g., disk drives, printers, etc.) which can be controlled directly or through an I/O controller; and managing traffic on bus 1112. Network communications instructions 1116 may establish and maintain network connections (e.g., software for implementing communication protocols, such as TCP/IP, HTTP, Ethernet, telephony, etc.).

Feature extraction instructions 1118 may enable computing device 1100 to perform one or more of connected component processing 110, tree building processing 120, path extraction processing 130, vector conversion processing 140, or any portion or combination thereof. Time series analysis instructions 1120 may enable computing device 1100 to perform time series analysis processing 150 and/or control or otherwise affect monitored system 10 in accordance with the results of time series analysis processing 150. Application(s) 1122 may be an application that uses or implements the processes described herein and/or other processes. In some embodiments, the various processes may also be implemented in operating system 1114.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of detecting network security anomalies from dynamic graph data comprising:
   receiving, by a processor, data including a plurality of graph snapshots for a plurality of consecutive periodic time samples, the data including a mapping between connected components in consecutive graph snapshots and describing at least one feature of each connected component, the mapping between the connected components including nodes representing entities in at least one computer network and edges representing relationships between the entities in the at least one computer network;
   recursively building, by the processor, a tree tracking an evolution of one of the connected components through the plurality of graph snapshots, the tree including a root node representing the connected component at a final one of the consecutive periodic time samples and a plurality of leaf nodes branching from the root node;
   extracting, by the processor, a plurality of paths from the tree, wherein each path is extracted by traversing the tree from the root node to one of the plurality of leaf nodes and each path contains data describing an evolution of a respective one of the connected components through time as indicated by evolution of the at least one feature of the respective one of the connected components;
   converting, by the processor, the dynamic graph data into time-series data compatible with a time series anomaly detection algorithm, by converting each of the plurality of paths into a respective numerical vector of a plurality of numerical vectors, the time series data tracking a change in the plurality of paths over time; and
   executing, by the processor, the time series anomaly detection algorithm on the plurality of numerical vectors, thereby detecting, based on the change in the plurality of paths over time, at least one security anomaly in the at least one computer network in communication with the processor.

2. The method of claim 1, further comprising generating, by the processor, an auxiliary dictionary including data describing, for each connected component, a set of nodes belonging to the connected component and the at least one feature of the connected component, wherein the data describing the evolution of the at least one feature of the one of the connected components through time is constructed from the data in the auxiliary dictionary.

3. The method of claim 2, wherein the recursively building comprises:
   for one of the consecutive periodic time samples for time t, adding nodes and edges created at time t;
   calculating the connected components for t;
   creating a matrix $M_t$ of a number of dimensions (((number of connected components at t−1)+1), (number of connected components at t));
   for every cell $M_t(i,j)$, filling in an intersection between sets of connected component i at t−1 and connected component j at t using the auxiliary dictionary;
   for each connected component j at t, saving (size of connected component j−sum($M_t[:,j]$)) in $M_t[-1,j]$, denoting a number of nodes which are part of j and not part of any connected component at t−1; and
   deleting the auxiliary dictionary.

4. The method of claim 1, wherein the recursively building comprises:
   for one of the consecutive periodic time samples for time t, associating one or more of the at least one features from t−1 with the root node;
   identifying all connected components from t−1 that were merged to create the root node;
   for each of the identified connected components, creating a tree node and attaching the tree node to the root node as a child;
   recursively performing the associating, identifying, and creating for times t−x until, for each path created, the first time (t=0) is reached or all identified connected components for the path are of size 0.

5. The method of claim 1, wherein the extracting comprises executing a depth first search algorithm on the tree.

6. The method of claim 1, wherein each of the respective numerical vectors includes the at least one feature of the one connected component and data describing each node in the path and how the nodes are interconnected.

7. A method of creating time series data from graph data for use in time series processing, comprising:
   receiving, by a processor, data including a plurality of graph snapshots for a plurality of consecutive periodic time samples, the data mapping between connected components in consecutive graph snapshots and describing at least one feature of each connected component, the mapping between the connected components including nodes representing entities in at least one computer network and edges representing relationships between the entities in the at least one computer network;
   recursively building, by the processor, a tree tracking an evolution of one of the connected components through the plurality of graph snapshots, the tree including a root node representing the connected component at a final one of the consecutive periodic time samples and a plurality of leaf nodes branching from the root node;
   extracting, by the processor, a plurality of paths from the tree, wherein each path is extracted by traversing the tree from the root node to one of the plurality of leaf nodes and each path contains data describing an evolution of a respective one of the connected components through time as indicated by evolution of the at least one feature of the respective one of the connected components;
   converting, by the processor, the graph data into time-series data compatible with a time series anomaly detection algorithm, by converting each of the plurality of paths into a respective numerical vector of a plurality of numerical vectors, the time series data tracking a change in the plurality of paths over time; and
   providing, by the processor, the plurality of numerical vectors as inputs to a time series anomaly detection algorithm executed by the processor or at least one other processor that detects anomalies in the at least one computer network based on the change in the plurality of paths over time.

8. The method of claim 7, further comprising generating, by the processor, an auxiliary dictionary including data describing, for each connected component, a set of nodes belonging to the connected component and the at least one feature of the connected component, wherein the data describing the evolution of the at least one feature of the one of the connected components through time is constructed from the data in the auxiliary dictionary.

9. The method of claim 8, wherein the recursively building comprises:

for one of the consecutive periodic time samples for time t, adding nodes and edges created at time t;

calculating the connected components for t;

creating a matrix $M_t$ of a number of dimensions (((number of connected components at t−1)+1), (number of connected components at t));

for every cell $M_t(i,j)$, filling in an intersection between sets of connected component i at t−1 and connected component j at t using the auxiliary dictionary;

for each connected component j at t, saving (size of connected component j−sum($M_t[:,j]$)) in $M_t[-1,j]$, denoting a number of nodes which are part of j and not part of any connected component at t−1; and deleting the auxiliary dictionary.

10. The method of claim 7, wherein the recursively building comprises:

for one of the consecutive periodic time samples for time t, associating one or more of the at least one features from t−1 with the root node;

identifying all connected components from t−1 that were merged to create the root node;

for each of the identified connected components, creating a tree node and attaching the tree node to the root node as a child;

recursively performing the associating, identifying, and creating for times t−x until, for each path created, the first time (t=0) is reached or all identified connected components for the path are of size 0.

11. The method of claim 7, wherein the extracting comprises executing a depth first search algorithm on the tree.

12. The method of claim 7, wherein each of the respective numerical vectors includes the at least one feature of the one connected component and data describing each node in the path and how the nodes are interconnected.

13. The method of claim 7, further comprising executing, by the processor, the time series anomaly detection algorithm on the plurality of numerical vectors, thereby detecting at least one security anomaly in at least one network in communication with the processor.

14. A system for creating time series data from graph data for use in time series processing, comprising:

a processor; and a non-transitory computer-readable medium in communication with the processor and configured to store instructions that, when executed by the processor, cause the processor to perform processing comprising:

receiving data including a plurality of graph snapshots for a plurality of consecutive periodic time samples, the data mapping between connected components in consecutive graph snapshots and describing at least one feature of each connected component, the mapping between the connected components including nodes representing entities in at least one computer network and edges representing relationships between the entities in the at least one computer network;

recursively building a tree tracking an evolution of one of the connected components through the plurality of graph snapshots, the tree including a root node representing the connected component at a final one of the consecutive periodic time samples and a plurality of leaf nodes branching from the root node;

extracting a plurality of paths from the tree, wherein each path is extracted by traversing the tree from the root node to one of the plurality of leaf nodes and each path contains data describing an evolution of a respective one of the connected components through time as indicated by evolution of the at least one feature of the respective one of the connected components;

converting the graph data into time-series data compatible with a time series anomaly detection algorithm, by converting each of the plurality of paths into a respective numerical vector of a plurality of numerical vectors, the time series data tracking a change in the plurality of paths over time; and providing the plurality of numerical vectors as inputs to a time series anomaly detection algorithm executed by the processor or at least one other processor that detects anomalies in the at least one computer network based on the change in the plurality of paths over time.

15. The system of claim 14, wherein the processing further comprises generating an auxiliary dictionary including data describing, for each connected component, a set of nodes belonging to the connected component and the at least one feature of the connected component, wherein the data describing the evolution of the at least one feature of the one of the connected components through time is constructed from the data in the auxiliary dictionary.

16. The system of claim 15, wherein the recursively building comprises:

for one of the consecutive periodic time samples for time t, adding nodes and edges created at time t;

calculating the connected components for t;

creating a matrix $M_t$ of a number of dimensions (((number of connected components at t−1)+1), (number of connected components at t));

for every cell $M_t(i,j)$, filling in an intersection between sets of connected component i at t−1 and connected component j at t using the auxiliary dictionary;

for each connected component j at t, saving (size of connected component j—sum($M_t[:,j]$)) in $M_t[-1,j]$, denoting a number of nodes which are part of j and not part of any connected component at t−1; and deleting the auxiliary dictionary.

17. The system of claim 14, wherein the recursively building comprises:

for one of the consecutive periodic time samples for time t, associating one or more of the at least one features from t−1 with the root node;

identifying all connected components from t−1 that were merged to create the root node;

for each of the identified connected components, creating a tree node and attaching the tree node to the root node as a child;

recursively performing the associating, identifying, and creating for times t−x until, for each path created, the first time (t=0) is reached or all identified connected components for the path are of size 0.

18. The system of claim 14, wherein the extracting comprises executing a depth first search algorithm on the tree.

19. The system of claim 14, wherein each of the respective numerical vectors includes the at least one feature of the one connected component and data describing each node in the path and how the nodes are interconnected.

20. The system of claim 14, wherein the processing further comprises executing the time series anomaly detection algorithm on the plurality of numerical vectors, thereby detecting at least one security anomaly in at least one network in communication with the processor.

* * * * *